United States Patent [19]
Miura et al.

[11] Patent Number: 5,535,184
[45] Date of Patent: *Jul. 9, 1996

[54] REPRODUCING APPARATUS HAVING A SINGLE MICROPROCESSOR TO PERFORM DATA RETRIEVAL DISC REPRODUCTION CONTROL

[75] Inventors: Yoshihiro Miura, Tokyo; Koji Takagi; Takashi Morita, both of Kanagawa; Fumihiko Yoshii, Tokyo, all of Japan

[73] Assignee: Sony Corporation, Japan

[*] Notice: The term of this patent shall not extend beyond the expiration date of Pat. No. 5,502,6950.

[21] Appl. No.: 460,645

[22] Filed: Jun. 2, 1995

Related U.S. Application Data

[60] Continuation of Ser. No. 96,770, Jul. 23, 1993, Pat. No. 5,502,695, which is a division of Ser. No. 20,179, Feb. 22, 1993, Pat. No. 5,359,580, which is a continuation of Ser. No. 626,216, Dec. 12, 1990, abandoned.

[30] Foreign Application Priority Data

Jan. 9, 1990 [JP] Japan ................................. 2-002149

[51] Int. Cl.⁶ .......................................... G11B 17/22
[52] U.S. Cl. ................................ 369/32; 369/48
[58] Field of Search ............................ 369/32, 33, 44.11, 369/44.28, 47, 48, 54, 53, 41, 50–51, 43; 360/78.14, 73.03, 78.04

[56] References Cited

U.S. PATENT DOCUMENTS

| | | | |
|---|---|---|---|
| 4,575,835 | 3/1986 | Nishikawa et al. | 369/50 |
| 4,817,068 | 3/1989 | Yamauchi | 369/30 |
| 4,817,075 | 3/1989 | Kikuchi et al. | 369/47 |
| 4,825,137 | 4/1989 | Nakajima et al. | 369/44.28 X |
| 4,829,498 | 5/1989 | Aoyagi et al. | 369/45 |
| 4,882,671 | 11/1989 | Graham et al. | 374/200 |
| 4,882,719 | 11/1989 | Kimura et al. | 369/32 |
| 4,926,405 | 5/1990 | Hangai et al. | 369/32 |
| 4,942,563 | 7/1990 | Yamamuro | 369/44 |
| 4,949,323 | 8/1990 | Yoshida | 369/32 |
| 4,962,494 | 10/1990 | Kimura | 369/48 |
| 5,109,365 | 4/1992 | Watanabe et al. | 369/32 |
| 5,359,580 | 10/1994 | Miura et al. | 369/32 |

FOREIGN PATENT DOCUMENTS

| | | |
|---|---|---|
| 0149101A1 | 12/1984 | European Pat. Off. |
| 860085268 | 4/1986 | European Pat. Off. |
| 870107356 | 4/1987 | European Pat. Off. |
| 0252646A1 | 6/1987 | European Pat. Off. |

*Primary Examiner*—Ali Neyzari
*Attorney, Agent, or Firm*—Limbach & Limbach; Charles P. Sammut

[57] ABSTRACT

A reproducing apparatus for a disc in which data read out from a disc are retrieved, in which, with the use of sole CPU, a data retrieval related processing is executed as a main routine and a reproduction control processing for the disc is executed as a subroutine by timer interrupt to achieve reduction in the number of the CPUs.

6 Claims, 4 Drawing Sheets

REPRODUCING APPARATUS HAVING A SINGLE MICROPROCESSOR TO PERFORM DATA RETRIEVAL DISC REPRODUCTION CONTROL

This is a continuation of application Ser. No. 08/096,770, filed Jul. 23, 1993, now U.S. Pat. No. 5,502,695; which is a divisional application of Ser. No. 08/020,179 filed Feb. 22, 1993, now U.S. Pat. No. 5,359,580; which is a continuation of 07/626,216 filed Dec. 12, 1990, now abandoned.

Disc Reproducing Apparatus Having a Single Microprocessor to Perform Data Retrieval and Disc Reproduction Control.

1. Field of the Invention

This invention relates to a reproducing apparatus for a disc in which data such as letter data, character data, or image data read out from the disc is displayed on a display section. More particularly, it relates to a reproducing apparatus in which a single CPU performs a data retrieval operation and performs servo processing involved in the reproduction of the data from the disc.

2. Description of the Related Art

The signal processing system of a disc reproducing apparatus for reproducing discs on which letter or character data is stored and which is capable of performing data retrieval, in which the disc searched to find data satisfying a search parameter input by the user is conventionally constructed using two or more CPUs, including a host CPU and a drive CPU, interconnected by a bus line.

In a signal processing system using two or more CPUs, jobs such as performing input key processing, display processing, data retrieval and bus line control are performed by the host CPU. Jobs such as servo control of the optical head, servo control of the optical head feed system, servo control of the disc rotating-driving means, processing signals from the optical head, data error correction and/or bus control are performed by a drive CPU. Among the jobs executed by the drive CPU, the above-mentioned servo control and signal processing functions are executed by a separate CPU which is connected to the drive CPU by a bus line.

If the signal processing system for the disc reproducing apparatus includes plural CPUs, the area occupied by the CPUs in the reproducing apparatus makes it impossible to reduce the size of the reproducing apparatus. In addition, it is difficult to design the bus line interconnecting plural CPUs, while the cost of the apparatus is increased through the use of plural CPUs.

OBJECT AND SUMMARY OF THE INVENTION

It is therefore an object of the present invention to provide a disc reproducing apparatus in which the above-mentioned problems of the conventional disc reproducing apparatus are overcome, and all of the signal processing operations in the disc reproducing apparatus are carried out by a single CPU.

The present invention provides a reproducing apparatus for an optical disc in which information data are recorded. The reproducing apparatus is capable of searching the information data recorded on the optical disc in response to a search parameter entered by the user to locate at least one portion of the information data satisfying the search parameter, and is also capable of reproducing the at least one portion of the information data for display to the user. The reproducing apparatus comprises a main body section and a display mounted on the main body section. The display displays the user input and displays the at least one portion of the information data reproduced from the optical disc following a search in response to the user input.

The main body section includes a disc reproducing system that reads the optical disc to provide reproduced data. The disc reproducing system includes an optical pickup that reads the optical disc to generate a playback signal, a signal processing circuit that processes the playback signal from the optical pickup to provide the reproduced data, and disc rotating driver that rotationally drives the optical disc. Operation of the disc reproducing system to provide the reproduced data is servo controlled by reproduction control signals. The main body section also includes the user input system that receives the user input specifying the search parameter from the user. Finally, the main body section includes one, and only one, central processing unit coupled to the disc reproducing system, the input system, and the display.

The central processing unit operates to perform a data retrieval operation. In the data retrieval operation, the user input specifying the search parameter is received from the user input system, the disc reproducing system is commanded to search the optical disc and to supply the reproduced data to the central processing unit, the reproduced data are compared with the search parameter, and at least one part of the reproduced data satisfying the search parameter is selected for display by the display as the at least one portion of the information data. The central processing units also operates in response to a timed interrupt to suspend the data retrieval operation and instead to perform a reproduction control operation in which the central processing unit performs processing to generate the reproduction control signals controlling operation of the disc reproducing system.

DETAILED DESCRIPTION OF PREFERRED EMBODIMENTS

Figure 1:
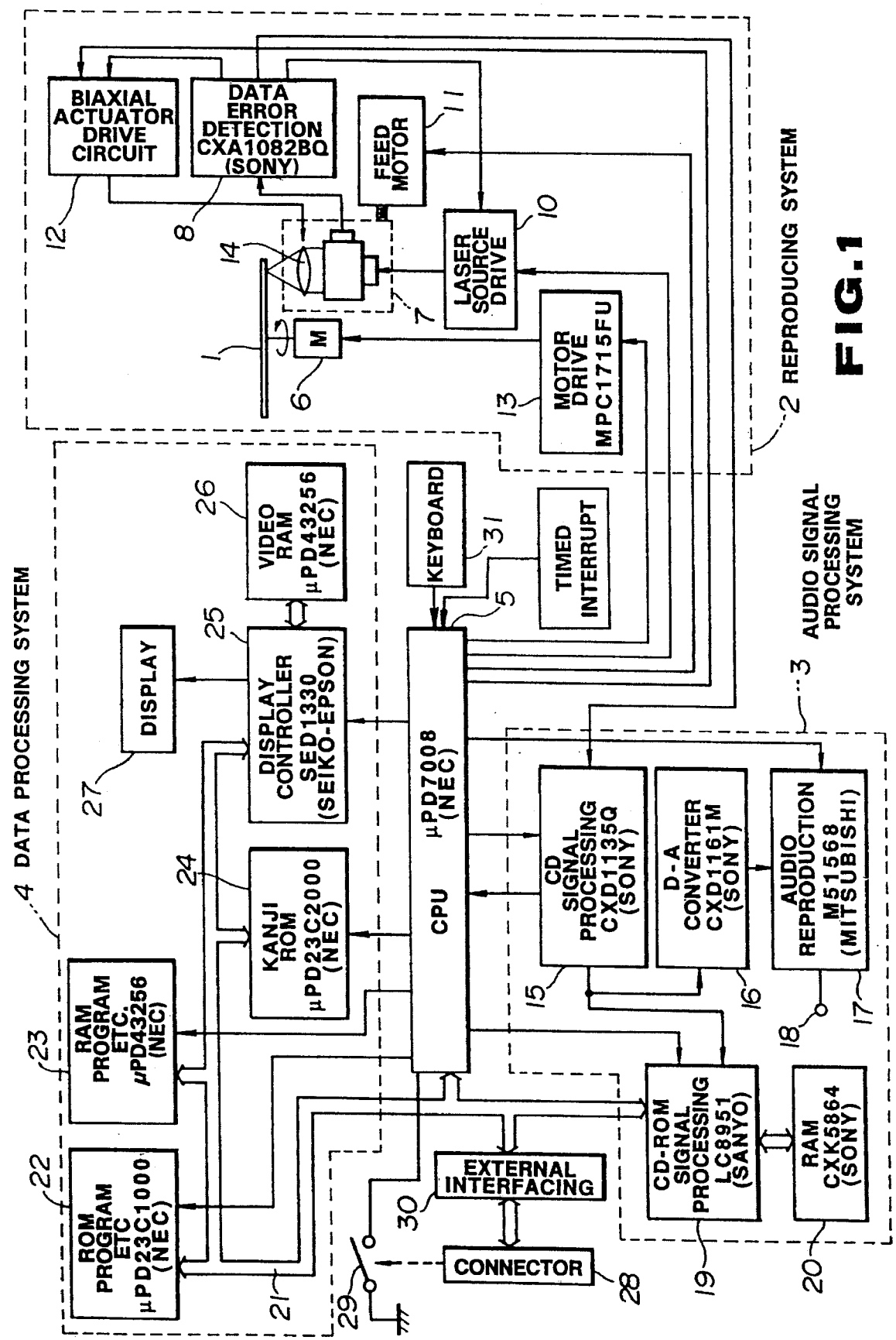
FIG. 1 is a block diagram showing a signal processing system of a disc reproducing apparatus according to the present invention.

By referring to the drawings, a preferred illustrative embodiment of the present invention will be described in detail.

The illustrative embodiment is described with reference to a portable disc reproducing apparatus in which information data, such as characters or letters, recorded on an optical disc are read out and displayed on a display section to provide the apparatus with the function of a so-called electronic dictionary.

Referring to FIG. 1, the signal processing system of the disc reproducing apparatus according to the present invention comprises a reproducing system 2 for reproducing data recorded on the optical disc 1, an audio signal processing system 3 for audio signal processing of the reproduced data, and a data processing system 4 for performing data retrieval on the information data recorded on the optical disc to select the data to be read out for display. The systems 2 to 4 are controlled by a central processing unit (CPU) 5 which will be described below. A CPU manufactured by NEC Corporation with the part number µPD 7008 is preferably employed as CPU 5.

In the reproducing system 2, the CPU 5, in response to an input signal from a keyboard 31 controls the laser light source driving circuit 10, a feed motor (linear feed motor) 11, a biaxial actuator driving circuit 12, and a motor driving circuit 13. A device manufactured by Motorola Inc. with the part number MPC1715FU is preferably employed as the motor driving circuit 13. The CPU 5 controls the motor driving circuit 13 for driving the spindle motor 6 to rotate the optical disc 1 at, for example, a constant linear velocity (CLV) or at a constant angular velocity (CAV), while simultaneously controlling the feed motor 11. The feed motor 11 moves the optical pickup, which comprises an objective lens 14 including a biaxial device, a light source, a photodetector, and a cylindrical lens or the like, to coarsely shift the light spot of the laser beam to a predetermined track on the optical disc 1. The CPU also controls the biaxial actuator driving circuit 12 for shifting the objective lens 14 of the pickup 7 both in the direction along the optical axis of the lens for focusing control and in the direction normal to the optical axis to finely shift the light spot into register with the predetermined track on the optical disc 1 for tracking control to reproduce the data recorded on the optical disc 1.

On a signal recording region of the optical disc 1, there are provided a sub-code area and a data area for each frame. Sync signals, position data and timing data are recorded in the sub-code area, while data such as character or letter data are recorded in the data area. The data signals read out from the optical disc 1 are supplied to an error detection-data detection circuit 8. The error detection-data detection circuit generates a sum or a product to provide a laser output error signal, a focusing error signal and a tracking error signal. As the error detection-data detection circuit 8, a device manufactured by Sony Corporation with the part number CXA1082BQ is preferably employed.

The laser output error signal is supplied to the laser light source driving circuit 10, while the focusing error signal and the tracking error signal are supplied to the biaxial actuator driving circuit 12. The laser light source driving circuit 10 controls the power of the laser light irradiating on the surface of the optical disc 1 to a constant value in response is the laser output error signal supplied thereto. The biaxial actuator driving circuit 12 is responsive to the focusing error signal and the tracking error signal to shift the objective lens 14 to maintain the focusing and tracking in a normal condition to provide for accurate data readout.

The signals reproduced from the optical disc 1 along with detected sync signals, timing data or the like, are supplied to a CD signal processing circuit 15 in the signal processing system 3 by way of the error detection-data detection circuit 8. A device manufactured by Sony Corporation with the part number CXD1135Q is preferably employed as the CD signal processing circuit 15. To this CD signal processing circuit 15 there are supplied from CPU 5 detection signals indicating the type of optical disc loaded in the disc reproducing apparatus, that is, whether the disc is an optical disc for audio on which audio data is recorded, or a CD-ROM, that is, an optical disc on which the character information of, for example, a dictionary or an encyclopedia, is recorded in the form of character data. The CD signal processing circuit 15 separates the detection signals supplied thereto into subdata signals such as sync signals or timing information and main data signals and, if the main data signals are audio data, feeds the audio data to a digital/analog (D/A) converter 16. A device manufactured by Sony Corporation with the part number CXD1161M, is preferably employed as the D/A converter 16. The audio data signal supplied to the D/A converter 16 is thereby convened into analog signals, which are then supplied to an audio reproducing circuit 17 so as to be outputted as audio signals at an output terminal 18. A device manufactured by Mitsubishi Electric Corporation with the part number M51568 is preferably employed as the audio reproducing circuit 17.

If the data signals supplied to the CD signal processing circuit 15 are the above-mentioned character data signals, the CD signal processing circuit 15 transmits the character data signals or the like to a CD-ROM signal processing circuit 19. A device manufactured by Sanyo Electric Co., Ltd. with the part number LC8951 is preferably employed as the CD-ROM signal processing circuit 19. The character data signals or the like supplied to the CD-ROM signal processing circuit 19 are reproduced, with the random access memory (RAM) 20 functioning as a transient storage means, in response to signals supplied thereto from CPU 5. A device manufactured by Sony Corporation with the part number CXK5864 is preferably employed as the RAM 20. The ROM 22 and the RAM 23, in which programs or the like are recorded, are connected to the data bus 21. Devices manufactured by NEC Corporation with part numbers µPD23C1000 and µP043256 are preferably employed as ROM 22 and RAM 23, respectively. The reproduced character data signals or the like are transmitted over data bus 21. A display image is stored in the video RAM 26 in accordance with Kanji patterns read out from a Kanji ROM 24 in response to the character data signals. The display image in the video RAM 26 is read out by the display controller 25 in response to signals from CPU 5 and are displayed on the display section 27, which includes, for example, a liquid crystal display (LCD). Devices manufactured by NEC Corporation with part numbers µPD23C2000 and µPD43256 are preferably employed as the Kanji ROM 24 and the display controller 25, respectively.

It will be noted that, when an external interface is connected to the connector 28, the switch 29 is turned on to reset the CPU 5. Signal processing is then performed under instructions supplied from the interface. These instructions are processed by the external interface processing circuit 30 and the thus-processed data are displayed on the display section 27 over data bus 21, as described previously.

Figure 3:
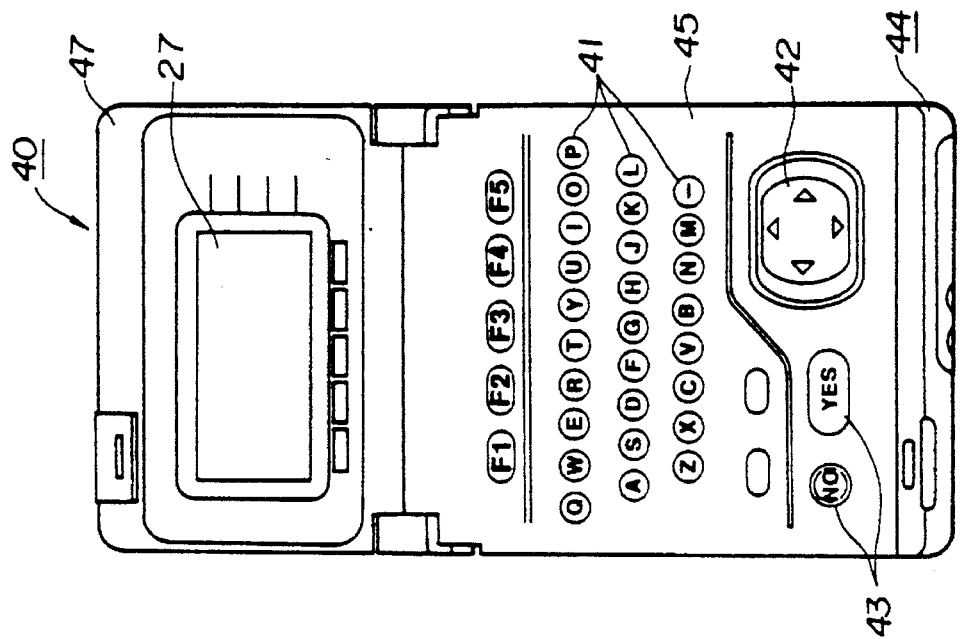
FIG. 3 is a plan view of the disc reproducing apparatus with the cover opened to illustrate the display section and the operating key section.
Figure 2:
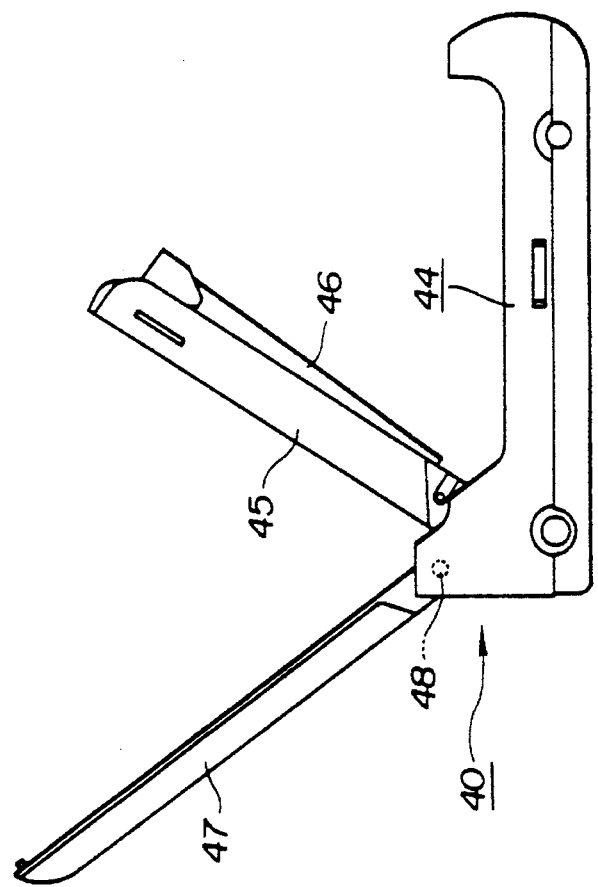
FIG. 2 is a perspective view showing the disc reproducing apparatus with the cover opened and with its cartridge holder rotated to the disc cartridge insertion or removal position.

Referring now to FIGS. 1, 2 and 3, the disc reproducing apparatus 40, which has the function of an electronic dictionary and which is provided with the above described signal processing system, has enclosed in the main body of the apparatus 44 the data processing system 4, the above mentioned data reproducing system 2, the CPU 5 and the audio signal processing system 3, excluding the display section 27, which may include, for example, an LCD display. Within the main body of the apparatus 44 may be loaded a disc cartridge accommodating therein a CD-ROM on which is recorded data such as data representing the characters of a dictionary or an encyclopedia. Referring to FIGS. 2 and 3, the operating key section 45, on which are arrayed various operating keys, such as the alphabetic keys 41, the cursor shift key 42, and the selection key 43 for selecting an item to which the cursor has been shifted, is rotatably mounted by a pivot shaft on the side of the main body 44 facing the outside when a cover is applied to the main body 44. On the reverse side of the key operating section 45 opposite to the side provided with the keys, there is provided a cartridge holder 46 into and out of which may be introduced or removed a disc cartridge containing the CD-ROM. The cartridge holder 46 is supported by the main body 44 so that the cartridge holder rotates with the rotation of the operating key section 45. The cover 47 for overlying the operating key section 45 to cover the upper side of the main body 44 is rotatably mounted by means of the pivot shaft 48.

On the inner surface of the cover member 47, that is the side facing the operating key section 45 when the main body 44 is covered as shown in FIG. 2, is provided the display section 27 for displaying the information, such as the character information, reproduced from the CD-ROM.

The cover member 47 fitted with the display section 27 is supported by the main body 44 in such a manner that, during use of the disc reproducing apparatus 40, the cover member 47 may be rotated to, and may be maintained at, a desired rotational position in which the surface of the operating key section 45 is exposed and the display screen of the display section 27 may be viewed easily. During non-use of the reproducing apparatus, the cover member 47 may be closed over the operating key section 45 into an overall compact rectangular form to facilitate handling or transport.

With the above-described disc reproducing apparatus 40, which is provided with the above described signal processing system and adapted to read out and reproduce data recorded on a CD-ROM for display on the display section, the portions of the disc reproducing apparatus which provide the user interface for data processing and display do not need strict processing timing and hence may be processed as a main routine. The remaining operations may be performed by an interrupt routine, so that all of the signal processing may be performed by the single CPU 5. Also in consideration that software control is performed between the drive CPU of the present apparatus and the host CPU of a commercially-available microcomputer system provided external of the present apparatus, the code system between the command packet and the status is utilized in the bus line system interconnecting these CPUs. When it is desired to control the present apparatus using an external host, the main routine executed by the drive CPU of the present apparatus is replaced by HALT commands so that the present apparatus may be controlled exclusively by the host CPU by starting a bus line control routine.

Figure 4:
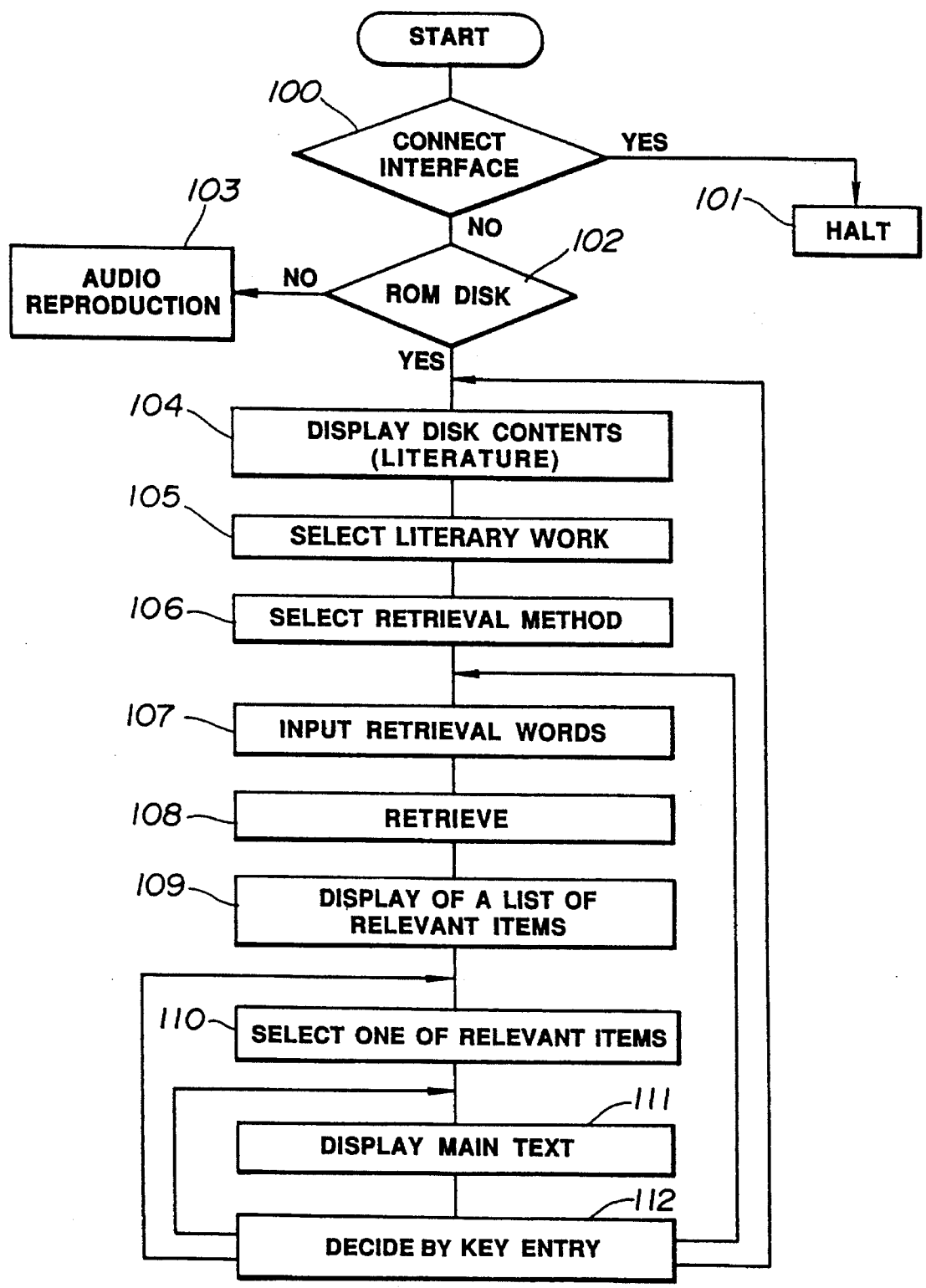
FIG. 4 is a flowchart showing the main routine executed by the CPU constituting the signal processing system of the disc reproducing apparatus.

The operation of the main routine executed by the CPU 5 will now be described with reference to the flow chart shown in FIG. 4.

First, in step 100, it is determined whether the external interface is connected to the disc reproducing apparatus, that is, whether the switch 29 has been turned on. If the switch 29 has been turned on, that is, if the external interface is connected, the program proceeds to step 101 where the CPU 5 is reset and a so-called HALT operation is performed under the instructions from the interface. If the switch 29 is off, the program proceeds to step 102.

In step 102, it is determined whether the optical disc loaded in the disc reproducing apparatus 40 is a CD-ROM disc, such as a dictionary or encyclopedia. If the result is NO, the disc is an optical disc for audio, and the program proceeds to step 103 where the above-mentioned audio reproduction signal processing is performed. If the result is YES, the program proceeds to step 104.

In step 104, the data signals reproduced from the loaded disc are processed, under the assumption that the data signals reproduced from the loaded disc are from a CD-ROM disc, and the display section 27 displays the literary works recorded on the disc (display of the contents). The program then proceeds to step 105.

In step 105, the program receives inputs from the key operating section 45 to enable the user to select a desired one of the displayed literary works by shifting the cursor displayed on the display section with the aid of the cursor shift key 42, and then using the selection key 43. The program then proceeds to step 106.

In step 106, the program receives inputs from the key operating section to enable the user to select a desired method of retrieving the desired one of the displayed literary works. In step 107, the program receives inputs from the alphabetic keys 41 on the keyboard 31 to enable the user to select a retrieve word. The program then proceeds to step 108.

In step 108, the program causes the CPU to perform the designated retrieve operation. The program then proceeds to step 109.

In step 109, the program causes the CPU to display a table of the relevant items found in the previous step on the display section 27. The program then proceeds to step 110.

In step 110, the program receives inputs from the key operating section 45 to enable the user to select a desired one of the displayed relevant items. The program then proceeds to step 111.

In step 111, the program causes the CPU to display the text of the selected item before the program proceeds to step 112.

In step 112, the program receives inputs from the key operating section 45. When the user desires to scroll the displayed text operation of the scroll key 45 returns the program to step 111 to perform text display in accordance with the operation of the scroll key. When the user desires to view other items displayed in step 109, operation of another of the keys returns the program to step 110 to enable the user to select another desired item. When the user desires to select some other word of the same literary work, operation of yet another key returns the program to step 107 to enable the user to enter the new word. When the user desires to view some other literary work, operation of yet another key returns the program to step 104 to redisplay the disc contents.

Since the above-mentioned main routine operation is operates in response to the user's key entry, the remaining signal processing operations, such as servo control, signal processing, data error correction, key entry or bus line control, are performed as interrupt subroutines. That is, no matter whether the main routine is in a stand-by state or is being executed, an interrupt demand signal requesting an interrupt is supplied to the CPU 5 every 13.3 milliseconds to force the CPU 5 to execute the subroutine.

Figure 5:
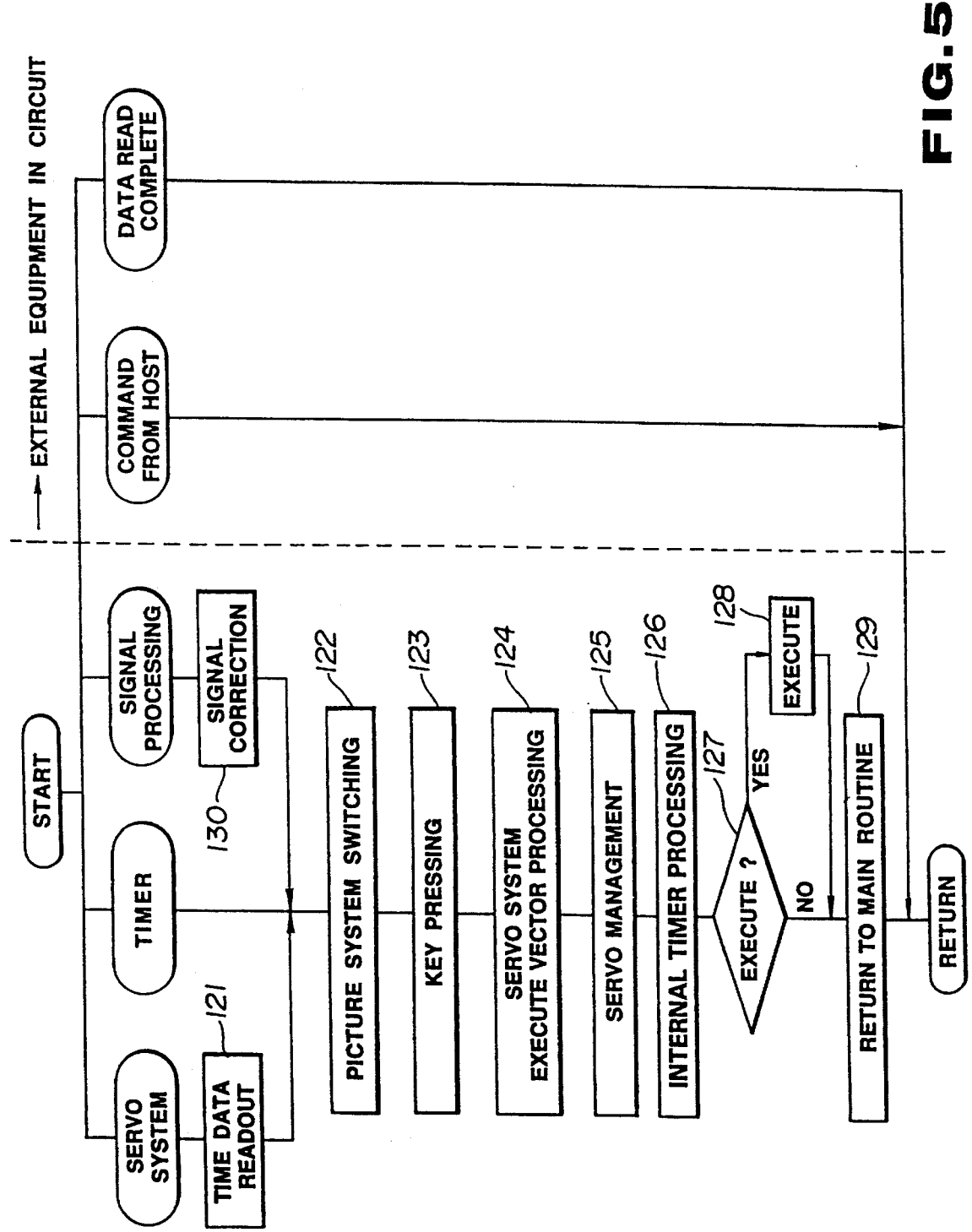
FIG. 5 is the flowchart showing the subroutine executed by the CPU.

The operation of the interrupt subroutine will be described by referring to the flowchart shown in FIG. 5.

In the interrupt subroutine, time data are read out at step 121 for detecting the position of the optical pickup 7 on the disc. The program then proceeds to step 122.

In step 122, the processing for the pickup system is performed before the program proceeds to step 123.

In step 123, the key-pressing operation is performed before the program proceeds to step 124.

In step 124, the vector processing for the servo system is executed before the program proceeds to step 125.

In step 125, servo supervision is performed before the program proceeds to step 126.

In step 126, internal timer processing is performed before the program proceeds to step 127.

In step 127, it is determined whether an execute operation is to be performed. If the result is YES, the program proceeds to step 128 where the execute operation is performed, after which the program proceeds to step 129. If the result is NO, the program proceeds directly to step 129.

In step 129, the program reverts to the main routine to resume data retrieval processing.

In the case of the time processing operation, the program executes the operations from step 122 to step 129. In the case of the signal processing operation, processing such as signal error correction is performed at step 130. Then, the program executes the operations from step 122 to step 129.

When the external interface is connected, a HALT process is performed in the main routine, as mentioned previously. In this case, the operation from steps 121 to 130 is still executed in response to the timed interrupt. Postprocessing is also executed following data readout and host commands given from the host by means of the above-mentioned interface.

It will be seen from the foregoing that the present invention provides a disc reproducing apparatus in which, with the use of a single CPU, a data retrieval operation is executed by the CPU as a main routine and reproduction control is effected by a subroutine in response to a timed interrupt. In this manner, the area set aside for CPU may be reduced compared with the conventional system employing plural CPUs, while the size of the base plate or the equipment and hence the cost may also be reduced.

In addition, hybrid code system processing resulting from the use of plural CPUs becomes unnecessary to facilitate software formulation.

What is claimed is:

1. A reproducing apparatus for an optical disc in which information data are recorded, the apparatus being capable of searching the information data recorded on the optical disc in response to a search parameter input by a user to locate at least one portion of the information data satisfying the search parameter, and of reproducing the at least one portion of the information data from the optical disc for display to the user, the reproducing apparatus comprising:

a main body section including:
      disc reproducing means for reading the optical disc to provide reproduced data, the disc reproducing means including optical pickup means for reading the optical disc to generate a playback signal, signal processing means for processing the playback signal from the optical pickup means to provide the reproduced data, and disc rotating driving means for rotationally driving the optical disc, operation of the disc reproducing means to provide the reproduced data being servo controlled by reproduction control signals,
      input means for receiving a user input from the user, the user input specifying the search parameter, and
      one, and only one, central processing means, coupled to the disc reproducing means, the input means, and a display means; and
   the display means mounted on the main body section for displaying the user input and for displaying the at least one portion of the information data reproduced from the optical disc by the disc reproducing means following a search in response to the user input;
   the central processing means:
      operating to perform a data retrieval operation in which the user input specifying the search parameter is received from the input means, the disc reproducing means is commanded to search the optical disc and to supply the reproduced data to the central processing means, the reproduced data are compared with the search parameter, and at least one part of the reproduced data satisfying the search parameter is selected for display by the display means as the at least one portion of the information data, and
      operating in response to a timed interrupt to suspend the data retrieval operation and instead to perform a reproduction control operation in which the central processing means performs processing to generate the reproduction control signals controlling operation of the disc reproducing means.

2. The apparatus of claim 1, wherein the central processing means operates in response to a single program in which the data retrieval operation is a main routine and the reproduction control operation as a subroutine.

3. The apparatus according to claim 2, additionally comprising timer means for generating the timed interrupt a predetermined time interval to force the central processing means to execute the subroutine.

4. The apparatus according to claim 1, additionally comprising mounting means for rotatably mounting the display section on the main body section.

5. A reproducing apparatus for an optical disc in which information data are recorded, the apparatus being capable of searching the information data recorded on the optical disc in response to a search request input by a user to locate at least one portion of the information data satisfying the search request, and of reproducing the at least one portion of the information data from the optical disc for display to the user, the reproducing apparatus comprising:

a main body section including:
      disc reproducing means for reading the optical disc to provide reproduced data, the disc reproducing means including optical pickup means for reading the optical disc to generate a playback signal, signal processing means for processing the playback signal from the optical pickup means to provide the reproduced data, and disc rotating driving means for rotationally driving the optical disc, operation of the disc reproducing means to provide the reproduced data being servo controlled by reproduction control signals,
      input means for receiving a user input from the user, the user input specifying the search parameter, and
      one, and only one, central processing means, coupled to the disc reproduction means, the input means, and a display means; and
   the display means mounted on the main body section, for displaying the user input, and for displaying the at least one portion of the information data reproduced from the optical disc by the disc reproducing means following a search in response to the user input;
   the central processing means executing a program including a main routine and a subroutine, the central processing means:
      operating in response to the main routine to perform a data retrieval operation in which the user input specifying the search parameter is received from the input means, the disc reproducing means is commanded to search the optical disc and to supply the reproduced data to the central processing means, the reproduced data are compared with the search parameter, and at least one part of the reproduced data satisfying the search parameter is identified for display by the display means, and in response to a timed interrupt, suspending execution of the main routine and executing the subroutine, the central processing means operating in response to the subroutine to perform processing to generate the reproduction control signals controlling operation of the disc reproducing means.

6. A reproducing apparatus for an optical disc in which information data are recorded, the apparatus being capable of searching the information data recorded on the optical disc in response to a search request input by a user to locate at least one portion of the information data satisfying the search request, and of reproducing the at least one portion of the information data from the optical disc for display to the user, the reproducing apparatus comprising:

a main body section including:

disc reproducing means for reading the optical disc to provide reproduced data, the disc reproducing means including optical pickup means for reading the optical disc to generate a playback signal, signal processing means for processing the playback signal from the optical pickup means to provide the reproduced data, and disc rotating driving means for rotationally driving the optical disc, operation of the disc reproducing means to provide the reproduced data being servo controlled by reproduction control signals, input means for receiving a user input from the user, the user input specifying the search parameter, and one, and only one, central processing means, coupled to the disc reproduction means, the input means, and a display means, and timer means for supplying a timed interrupt demand signal to the central processing means; and the display means mounted on the main body section for displaying the user input, and for displaying the at least one portion of the information data reproduced from the optical disc by the disc reproduction means following a search in response to the user input;

the central processing means executing a program including a main routine and a subroutine, the central processing means:

operating in response to the main routine to perform a data retrieval operation in which the user input specifying the search parameter is received from the input means, the disc reproducing means is commanded to search the optical disc and to supply the reproduced data to the central processing means, the reproduced data are compared with the search parameter, and at least one part of the reproduced data satisfying the search parameter is selected for display by the display means as the at least one portion of the information data, and in response to the timed interrupt demand signal generated by the timer means, suspending execution of the main routine and executing the subroutine, the central processing means operating in response to the subroutine to perform processing to generate the reproduction control signals controlling operation of the disc reproducing means.

* * * * *